(12) United States Patent
Droba

(10) Patent No.: US 7,784,062 B2
(45) Date of Patent: Aug. 24, 2010

(54) EVENT BASED OPERATING SYSTEM, METHOD, AND APPARATUS FOR INSTRUMENTATION AND CONTROL SYSTEMS

(75) Inventor: Gregory Scott Droba, San Jose, CA (US)

(73) Assignee: General Electric Company, Schenectady, NY (US)

( * ) Notice: Subject to any disclaimer, the term of this patent is extended or adjusted under 35 U.S.C. 154(b) by 1706 days.

(21) Appl. No.: 10/970,570

(22) Filed: Oct. 21, 2004

(65) Prior Publication Data

US 2005/0283553 A1   Dec. 22, 2005

Related U.S. Application Data

(63) Continuation-in-part of application No. 10/872,205, filed on Jun. 18, 2004, now Pat. No. 7,437,200.

(51) Int. Cl.
G06F 9/46 (2006.01)
G06F 11/01 (2006.01)

(52) U.S. Cl. .................................. 719/318; 700/21

(58) Field of Classification Search .................. 719/318
See application file for complete search history.

(56) References Cited

U.S. PATENT DOCUMENTS

| | | |
|---|---|---|
| 4,316,245 A | 2/1982 | Luu et al. |
| 4,318,182 A | 3/1982 | Bachman et al. |
| 4,320,451 A | 3/1982 | Bachman et al. |
| 4,369,494 A | 1/1983 | Bienvenu et al. |
| 4,374,409 A | 2/1983 | Bienvenu et al. |
| 4,394,725 A | 7/1983 | Bienvenu et al. |
| 4,395,757 A | 7/1983 | Bienvenu et al. |
| 4,432,051 A | 2/1984 | Bogaert et al. |
| 4,570,217 A | 2/1986 | Allen et al. |
| 4,584,165 A | 4/1986 | Wilson et al. |
| 4,809,269 A | 2/1989 | Gulick |
| 5,742,825 A | 4/1998 | Mathur et al. |
| 6,496,848 B1 * | 12/2002 | Nankaku ..................... 718/100 |
| 6,505,229 B1 | 1/2003 | Turner et al. |
| 6,647,301 B1 | 11/2003 | Sederlund et al. |
| 6,650,722 B1 | 11/2003 | Steiner et al. |
| 6,775,728 B2 | 8/2004 | Zimmer et al. |
| 6,931,546 B1 | 8/2005 | Kouznetsov et al. |

(Continued)

OTHER PUBLICATIONS

"Real-Time Operating Systems," Chapter from Book Publication, details unknown.

*Primary Examiner*—Hyung S Sough
*Assistant Examiner*—Abdou K Seye
(74) *Attorney, Agent, or Firm*—Armstrong Teasdale LLP

(57) ABSTRACT

A method for operating a controller having a number of timers to thereby control a plurality of events greater than the number of timers, includes, between clock ticks, receiving one or more signals from sensors, switches, executing programs, or a combination therefore that initiate one or more timed events. After a clock tick immediately following the receiving of the one or more signals, the method further includes updating entries in an event control block in accordance with the received signal or signals. The entries include a time remaining for pending events, a time past due for active events, and a priority of each event. The method further includes determining whether any pending event or events have timed out, activating any timed out events, and sending a signal notifying an executing program of the activated event having the highest priority.

12 Claims, 9 Drawing Sheets

U.S. PATENT DOCUMENTS

| | | | |
|---|---|---|---|
| 7,487,502 B2* | 2/2009 | Wang et al. | 718/102 |
| 2001/0015818 A1 | 8/2001 | Kawanabe et al. | |
| 2002/0078257 A1* | 6/2002 | Nishimura | 709/318 |
| 2003/0154398 A1* | 8/2003 | Eaton et al. | 713/201 |
| 2004/0031034 A1 | 2/2004 | Lewis | |
| 2004/0031040 A1* | 2/2004 | Chheda et al. | 719/318 |
| 2004/0123295 A1 | 6/2004 | Karam et al. | |
| 2004/0230794 A1* | 11/2004 | England et al. | 713/164 |
| 2005/0177666 A1* | 8/2005 | Kimelman et al. | 710/200 |

\* cited by examiner

Fig. 7B

EventSemaphore (DWORD) (MSB)

| Bit | Event |
|---|---|
| 16 | MBV5_FAILED_TO_MOVE |
| 17 | MBV1_FAILED_TO_MOVE |
| 18 | LAMP_TEST_EVENT |
| 19 | HEX_DUMP |
| 20 | MEMORY_RESET_EVENT |
| 21 | FIVE_SEC_EVENT |
| 22 | STEP_DISPLAY_EVENT |
| 23 | WATCHDOG_TEST |
| 24 | START_SELF_TEST |
| 25 | UPDATE_NVRAM_EVENT |
| 26 | INVALID_EVENT |
| 27 | SPARE |
| 28 | SPARE |
| 29 | SPARE |
| 30 | SPARE |
| 31 | SPARE |

FlagSemaphore (WORD)

EVENT BASED OPERATING SYSTEM, METHOD, AND APPARATUS FOR INSTRUMENTATION AND CONTROL SYSTEMS

CROSS REFERENCE TO RELATED APPLICATIONS

This application is a continuations-in-part of U.S. patent application Ser. No. 10/872,205 filed Jun. 18, 2004, now U.S. Pat. No. 7,437,200, to Gregory Scott Droba and Stanley Anthony Frederick, entitled "Software Based Control System for Nuclear Reactor Standby Liquid Control (SLC) Logic Processor," which is also assigned to the assignee of the present application and which is also hereby incorporated by reference in its entirety.

BACKGROUND OF THE INVENTION

This invention relates generally to computer operating systems and more particularly to computer operating systems for providing enhanced timing capability in instrumentation and control systems.

A Standby Liquid Control (SLC) Logic Processor for a nuclear power plant must react to a number of different events quickly, and therefore must monitor parameters of a number of different systems within the power plant. Some of these parameters change frequently and/or periodically, while others may change only in response to extremely rare events that may never occur in any particular plant. To detect events and change context of the state of a logic processor while incurring a limited amount of overhead, a microprocessor Operating System (OS) can be employed. In some configurations, an SLC may require more simultaneous timers (for example, eight simultaneous timers) than are available in a single microcontroller.

A task oriented OS is employed in at least some known Nuclear Measurement Analysis and Control (NUMAC) instruments. This OS requires all tasks be a executed in a round-robin fashion. The application of this type of OS requires overhead and unnecessary execution of certain functions. Although multiple timing events can be monitored by creating a global static variable as a counter for each timer. These variables can be set and decremented (or incremented) using a system clock. Although fairly straightforward, this method for monitoring a plurality of timing events using a limited number of timers tends to increase the amount of code written and increases maintenance cost for that code. Additionally, the use of global variables makes the design of interfaces more complicated and the operation of different modules more interdependent than may be desired.

BRIEF DESCRIPTION OF THE INVENTION

Some configurations of the present invention therefore provide a method for operating a controller having a number of timers to thereby control a plurality of events greater than the number of timers. The method includes, between clock ticks, receiving one or more signals from sensors, switches, executing programs, or a combination therefore that initiate one or more timed events. After a clock tick immediately following the receiving of the one or more signals, the method further includes updating entries in an event control block in accordance with the received signal or signals. The entries include a time remaining for pending events, a time past due for active events, and a priority of each event. The method further includes determining whether any pending event or events have timed out, activating any timed out events, and sending a signal notifying an executing program of the activated event having the highest priority.

In some other aspects of the present invention, there is provided a machine readable medium or memory having recorded thereon or therein a non-preemptive operating system including instructions configured to instruct a processor to perform various functions. These functions include, between clock ticks, receiving one or more signals from sensors, switches, executing programs or a combination thereof that initiate one or more timed events. The functions further include, on or after a clock tick immediately following the receiving of one or more signals, updating entries in an event control block in accordance with the received signal or signals, wherein the entries include a time remaining for pending events, a time past due for active events, and a priority of each event. The functions also include determining whether any pending event or events have timed out and activating any timed-out events, and sending a signal notifying an executing program of the activated event having the highest priority.

In yet other aspects, the present invention provides a controller comprising a processor having a number of timers and memory including instructions for the processor. The controller is configured to, between clock ticks, receive one or more signals from sensors, switches, executing programs or a combination thereof that initiate one or more timed events. The controller is further configured to, on or after a clock tick immediately following the receiving of the one or more signals, update entries in an event control block in accordance with the received signal or signals. The entries include a time remaining for pending events, a time past due for active events, and a priority of each event. The controller is further configured to determine whether any pending event or events have timed out, activate any timed-out events, and send a signal notifying an executing program of the activated event having the highest priority.

It will thus be recognized the configurations of the present invention advantageously provide timing of a plurality of events, such as events in an industrial plant, using a controller having one or more physical timers, wherein the number of physical timers is less than the number of timed events.

DETAILED DESCRIPTION OF THE INVENTION

Figure 1:
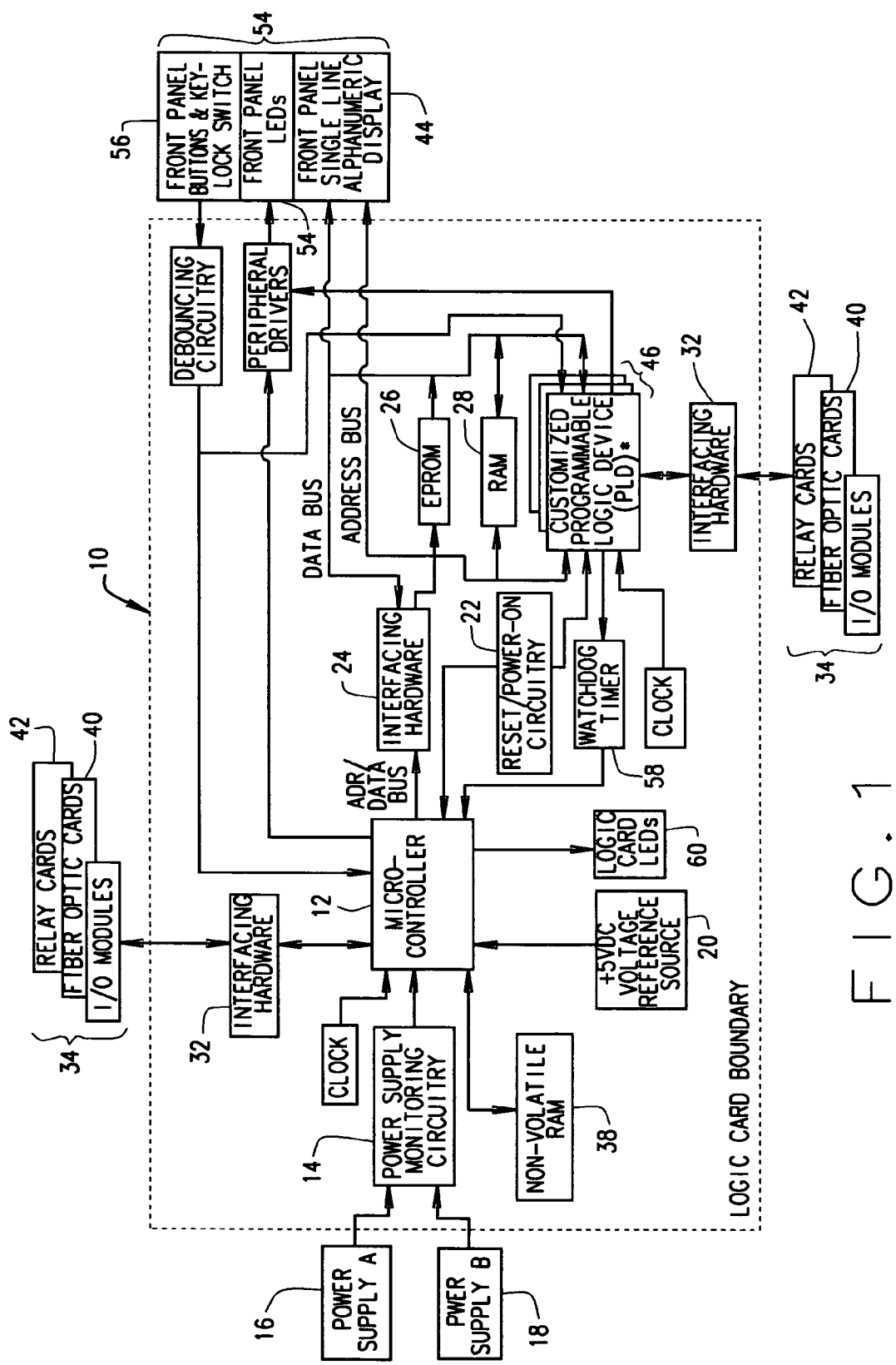
FIG. 1 is a block diagram representative of various configurations of a logic card of the present invention.

Configurations of the present invention provide advanced control of timed events, such as those that occur in industrial plants, including nuclear power generating plants. Technical effects of some configurations of the present invention include the timing of a number of events greater than the number of available hardware timers, and assurance that timed events will occur within some period of time.

In some configurations, a microcontroller architecture suitable for use as a safety control in an industrial process is provided. Although this architecture is suitable for use in many industrial processes, it is particularly well-suited for use in nuclear power instrumentation and control systems. For example, the microcontroller architecture is suitable for use in Nuclear Measurement Analysis and Control (NU-MAC) modules, High Pressure Core Flooder (HPCF) control modules, Output Logic Unit (OLU) modules, and Standby Liquid Control (SLC) modules. These modules comprise a family of microcontroller-based chassis that employ configurations of the present invention. In various configurations, these instruments are modular and are also scalable via the addition of relays, fiber/optic communication links, input contact cards or other input/output (I/O) cards that can be inserted directly or indirectly on a logic board (motherboard) containing a microcontroller, firmware, customized logic (CPLDs), EPROM, NVRAM, RAM and various ICs. Some configurations of the present invention employ standardization for all removable modules so that like modules are interchangeable. All external connections and interfaces in some configurations are accommodated on the back of an instrument panel to enhance maintenance. Technical effects that are achieved by various configurations of the present invention include automation of manual surveillance functions for analog safety systems, easily scaled operation, and advantageous standardization of components, among others.

Instruments utilizing microprocessor architecture configurations of the present invention can be designed to fit standard 48.26 cm (19 in) width industrial racks and can be of a standard height, e.g., 13.335 cm (5.25 in) high. In some configurations of the present invention, redundant power supplies (e.g., two power supplies) are used to provide failsafe and robust electrical needs of the instrument utilizing the microprocessor architecture. Some configurations provide self test and surveillance methods for a particular application in microcontroller firmware. The microcontroller subsystem logic runs independently of logic contained in the CPLD subsystem and, in some configurations, an interface is provided between the microcontroller and the CPLDs that allows either subsystem to function in the event of a catastrophic failure in the other. When utilized in a plurality of instruments, configurations of the present invention provide a consistent user interface and feedback ("look and feel"). Also, each instrument can be secured from the front panel using, for example, a key-lock switch. Push buttons, LEDs and/or an alphanumeric display are also provided in some configurations of the present invention. New instruments can be scaled to meet specific customer and technical requirements. For example, devices to accommodate a particular communication protocol (i.e. MIL-STD-1553, RS-232, etc), relays designed to handle specific voltages and currents (i.e. 12VDC, 24VDC, 120VAC), and fiber optic cards designed to transmit and receive data at different wavelengths of light (i.e. 850 nm, 1300 nm) can be accommodated in various configurations of the present invention.

In some configurations of the present invention, instruments are rack-mountable for installation in standard instrument racks, e.g., 48.26 cm (19 in) instrument racks. For example, an instrument chassis in some configurations of the present invention is 48.26 cm (19 in) wide, 13.335 cm (5.25 in) high, and between 30.48 cm to 35.56 cm (12 in to 14 in) deep. Each instrument chassis can include a front panel display, dual redundant power supplies, a logic card, and I/O cards suitable for the intended application of the instrument. Like modules are directly interchangeable between instruments, both electrically and mechanically, and do not require any calibration upon exchange.

In some configurations of the present invention and referring to FIG. 1, a logic card 10 provides instrument logic and control, status communication to external systems (i.e., systems external to the instrument in which logic card 10 is contained), and operator display and keyboard control. Some configurations of logic card 10 include the following components:

Microcontroller

Microcontroller 12 is provided to handle high-speed calculations and fast input/output operations. An example of a suitable microcontroller is the 87C196KD microcontroller, a 16-bit CHMOS processor available from Intel Corporation, Santa Clara, Calif. Features of this microcontroller useful for configurations of the present invention include 20 MHz clocking, 1 kilobyte register RAM, a full duplex serial port, five 8-bit I/O ports, four internal 16-bit timers, and a 10-bit A/D converter with an input MUX.

Functional operation on the logic card is monitored by microcontroller 12. Microcontroller 12 transmits asynchronous serial status messages which can be used for surveillance purposes, provides keyboard and display control, and monitors digital I/O lines. In addition to these functions, the microcontroller performs start-up and on-line self-testing by monitoring power supply and external sensor voltages and by checking memory integrity. Communication messages transmitted can be looped back for validation by self-test.

Microcontroller Supervisor

Microprocessor supervisor logic includes power supply monitoring circuitry 14 that monitors +5 VDC power for logic card 10 and I/O modules 34 that is supplied from redundant power supplies 16 and 18 and generates a reset for microcontroller 12 when the voltage is between +4.50 to 4.60 VDC. This reset also clears CPLD control logic 46 to an initialized state. A +5 VDC voltage reference source 20 and reset/power-on circuitry 22 are also provided as part of the microprocessor supervisory logic.

One or more Complex Programmable Logic Devices (CPLDs) 46 are provided in addition to microcontroller 12 to perform control and decoding and/or provide functional logic.

Control and Decoding Hardware

In some configurations of the present invention, control and decoding hardware includes or consists essentially of a Complex Programmable Logic Device or Devices (CPLDs) 46 that are configured to provide one or more of:

1. Address decoding for EPROM 26 and RAM 28 and all memory mapped I/O functions;
2. Address decoding for various logic status registers; and
3. Wait-state generator control on microcontroller 12 for slower peripheral access (for example, front panel LED displays 30 require 3 wait states in some configurations for a read or write access).

Functional Logic Interface Hardware

In some configurations of the present invention, functional logic interface hardware includes or consist essentially of a Complex Programmable Logic Device or Devices (CPLDs) that are configured to provide at least one of:

1. Various frequency dividers;
2. Functional logic that monitors trip status and I/O and can generate trip commands and other control commands;
3. Support logic for various communication protocols; and 4. Support for external interface cards 34 and other glue logic.

Configurations of logic card 10 can accommodate a plurality of CPLDs 46 (e.g., up to 3 on one card in some configurations), and CPLDs may be socketed for easy servicing, replacement, or reconfiguration. The control and decoding hardware and the functional logic interface hardware can thus be contained within a single CPLD, two separate CPLDs, spread across two or more CPLDs, etc. The invention does not require a one-to-one correspondence between the control and decoding hardware and the functional logic interface hardware on the one hand and individual CPLDs on the other.

Input Power Protection and Analog Reference

The following power input lines on the control card are protected by auto-resetting thermal current limiting devices (not separately shown in FIG. 1): +5 VDC, +5VDC front panel, +5VDC fiber optic, +5VDC relay cards A & B, +24 VDC and +48 VDC These devices heat up when the current limit is reached and open-circuit until the over-current condition is corrected. The input power lines are monitored by microcontroller 12 during self-test using power supply monitoring circuitry 14. The result of this test for each measurement is combined to control a Power Fault LED (included in LEDs 30) displayed on the front panel. In some configurations, power supply voltages are accessible for measurement at test points on a rear panel of an instrument comprising logic card 10.

A +5VDC reference 20 needed for microcontroller 12 A/D converter is produced from the +24VDC input power and is monitored by an under/over voltage detection circuit.

EPROM and RAM Memory

In some configurations, an EPROM 26 is provided for non-volatile program storage. A 32 Kbyte EPROM can be provided for this purpose. Static RAM 28, for example, an 8 Kbyte static RAM, is provided in some configurations as high speed Read/Write memory for use by microcontroller 12.

Nonvolatile RAM

A nonvolatile RAM 38 such as a 2K×8 bit ferroelectric RAM is provided in some configurations for storage of application parameters that should not be lost when power is removed. These parameters depend upon the application in which card 10 is utilized, but a non-exhaustive list of possible application parameters that can be stored in nonvolatile RAM 38 can include self-test error codes and counts, calibration parameters, and the like. RAM 38 in some configurations is a serial device with low power consumption and very high write endurance characteristics.

Fiber Optic Interface Card

Fiber Optic Interface Cards 40 provide conversion between optical and electrical signals. In some configurations of the present invention, each card includes 6 physical channels. These channels can be used for transmitting, receiving, or bi-directional communication, depending upon the application of card 10. For example, each channel can operate with fiber optic signals having a peak sensitivity wavelength of 850 nm although some configurations use other wavelengths, for example, 1300 nm. Optical transmitters and receivers mate to standard ST type optical connectors in some configurations.

Relay I/O Cards

In many applications, one or more relay I/O cards 42 are provided. I/O card 42 may include, for example, mechanical latching relays, non-latching relays, contact closure sensing circuits, or any combination thereof. Each I/O card 42 is configured as an interface buffer between logic card 10 and other devices being controlled ("the outside world," as seen from the viewpoint of logic card 10). High voltage signals coming into the chassis are translated to standard TTL levels. Standard TTL level signals are sent to these cards, in many instances to switch the much higher voltages that are used by external systems.

Fiber optic interface cards 40 and relay I/O cards 42 permit control and/or sensing and surveillance of an external system (for example, and without limitation, valves, pumps, or other instruments) while providing electrical isolation between the external system and components on logic card 10. In this manner, logic card 10 is less subject to failures resulting from electrical disturbances in the external system or communication lines between the safety instrumentation and the external system. Interfacing hardware 32 is provided in some configurations to interface between microcontroller 12 and/or CPLDs 46 and any interface cards 34 present in an instrument.

Figure 2:
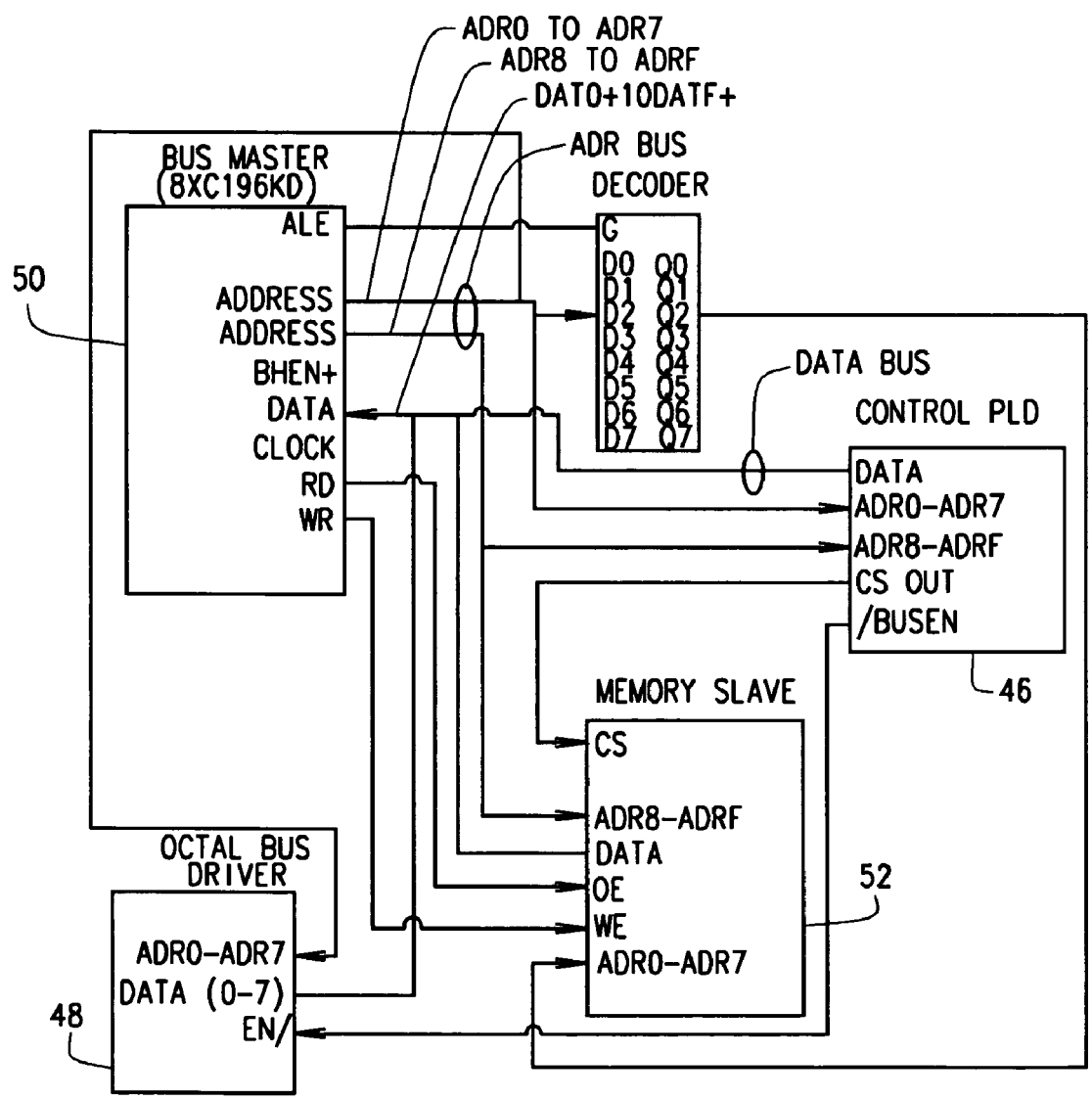
FIG. 2 is a schematic diagram representative of one suitable bus configuration of the logic card of FIG. 1.

Whether using external logic or a CPLD, some configurations of the present invention employ a bus that supplies an interface for up to four I/O cards 34, front panel displays 30 and/or 44, EPROM 26, RAM 28, and one to three Custom Programmable Logic Devices CPLDs 46. A portion of a suitable bus configuration is shown in FIG. 2 and includes, among other things, an address bus (ADR BUS) and a data bus (DATA BUS), sometimes referred to collectively herein as an address/data bus (ADDR/DATA BUS). The bus structure carries signals to allow components to interact with each other and to allow memory and I/O data transfers, direct memory accesses, and other functions. The bus structure is a variation of a "master-slave" configuration in which a master device 50 takes control of the bus and a slave device (for example, slave device 52), upon decoding its address, acts upon a command provided by the master device.

In some configurations, an 8XC196KD device (available from Intel Corporation, Santa Clara, Calif.) acts as BUS master 50. It sends an Address Latch Enable (ALE) signal to an external latch to demultiplex an address from the address/data bus. This signal is used for external memory (e.g., RAM 28 and EPROM 26) and is used to decode the lower eight address signals. Other peripheral devices are addressed and controlled via a combination of a CPLD 46 and one or more octal BUS drivers 48. CPLD 46 decodes the upper 8 address lines and will issue an ENABLED signal to the correct octal BUS Driver 48, allowing a peripheral device to be addressed using the lower 8 address lines. Signals transferred over the bus can be grouped into several classes based on the functions they perform. The classes comprise control signals, address and inhibit signals, and data signals.

Surveillance Capabilities

In some configurations of the present invention, self test status and reporting features are provided to supports enhanced surveillance capabilities. In addition, power supply voltages are made available at a back panel of an instrument that includes logic card 10. Software or firmware running, for example, in microcontroller 12 tests and reports voltage over and under bus conditions. The voltage of each monitored power supply can be measured by a DVM directly from the back of the panel in some configurations.

In various configurations of the present invention, microcontroller 12 and CPLDs 46 run as two separate subsystems in parallel. By appropriately partitioning safety related logic and glue logic into the CPLDs, a catastrophic failure in any one subsystem need not affect any other subsystem. For example, a set of address/data latches, multiplexors, demultiplexors, and interrupt controllers used by microcontroller 12 be programmed into a first CPLD 46. Another CPLD 46 (or set of CPLDs) can be programmed to contain logic necessary to implement functionality of the instrument in which logic card 10 is contained, thereby advantageously providing flexibility in configuring operation of the instrument. Hundreds of registers and address decoders can be added (up to the physical limit of CPLDs 46) for use by microcontroller 12. A CPLD 46 that defines the operation of the instrument in which logic card 10 is contained can readily be tailored for future plant applications. For example, I/O lines, timers, waveform generators, and various state machines can readily be added. Glue logic for microcontroller 12 (in a CPLD 46 or elsewhere) provides buffering between the microcontroller logic subsystem 12 and CPLD logic subsystem 46. As long as the buffering CPLD 46 is operating normally in such configurations, a catastrophic failure of logic in microcontroller 12 will not affect the performance of instrument logic card 10. This separation allows instrument logic card 10 to operate and interface with other equipment that may have a different safety classification. For example, CPLDs 46 can perform a safety related function for which human lives are dependant on its operation and software or firmware in EPROM 26 and/or RAM 28 can be provided to instruct microcontroller 12 to perform non-safety functions that have no capacity to jeopardize human life. Alternately, CPLDs 46 can perform non-safety related functions and microcontroller 12 in conjunction with EPROM 26 and/or RAM 28 can perform the safety-related function. CPLDs 46 and microcontroller 12 can also be configured to cooperatively perform selected functions. Front panel indicators 30 and/or 44 are controlled by logic card 10 and provide a user with information about an external system (e.g., valve or pump status or external sensors providing input to the instrument) being monitored and/or controlled by an instrument comprising logic card 10.

Figure 3:
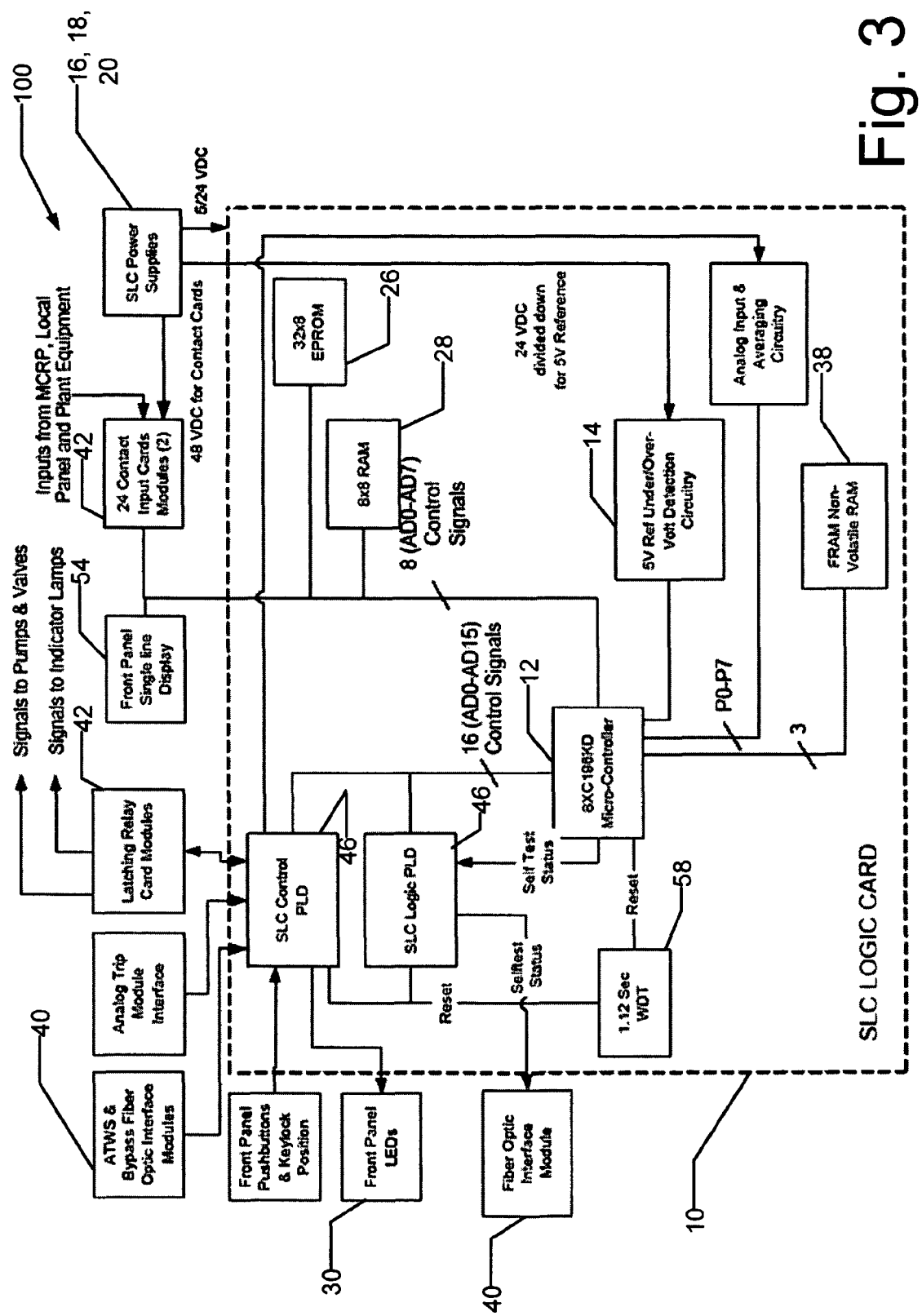
FIG. 3 is a block diagram representative of a safety control instrument (in this case, a Standby Liquid Control [SLC] Logic Processor) comprising a logic card configuration as represented in FIG. 1.

As discussed above, logic card 10 can be used in many different types of instruments (e.g., OLU, SLC, HPCF) and is particularly suitable for a plurality of safety systems in nuclear power generation plants. For example, in one configuration of a Standby Liquid Control (SLC) system in a nuclear power plant having a reactor vessel, a boron solution is injected into the reactor vessel when commanded by at least two out of four divisional Anticipated Transient Without Scram (ATWS) logic units or by an operator initiated keyswitch. This injection process is sufficient to bring the reactor from full power to a sub-critical condition without control rod movement. The SLC system in some configurations comprises two redundant SLC Logic Unit controllers located in Safety Divisions 1 and 2. Referring to FIG. 3, a logic card 10 configured as an SLC Logic Processor 100 is used in the SLC system to act via automatic or manual initiation. Once initiated, SLC Logic Processor 100 automatically controls the necessary valves and pumps to bring the reactor from full power to a sub-critical condition without control rod movement. SLC Logic Processor 100 uses hardware- and software-based logic (including microcontroller 12 and CPLDs 46) in a cooperative manner to perform control functions as well as software to monitor and report the status of SLC Logic Processor 100 to automate surveillance activity. Logic card 10 in SLC Logic Processor 100 has a modular design and can be configured to provide automatic notification of an instrument failure to an operator. Self-test software and hardware functions are provided in some configurations to allow for faults to be identified at the module level. For this reason, various configurations of SLC Logic Processor 100 can be repaired promptly (e.g., within 30 minutes) by replacement of modules.

SLC Logic Processor instrument 100 is a member of the NUMAC family and uses logic card 10, including CPLDs 46, microcontroller 12, and software/firmware programming. Some embodiments are configured to process manual start/stop signals from the Main Control Room Panel for SLC injection to fulfill the "defense-in-depth" and diversity requirements for this system. Some configurations also provide self-test and status diagnostics which are displayed on the front panel (see FIG. 4) of the instrument and sent to the Reactor Trip and Isolation Function (RTIF) Communications Interface Module (CIM). In some configurations, safety-related functions are performed by hardwired (CPLDs 46) and software logic cooperatively in SLC Logic Processor 100. Software monitors these functions via self-test diagnostics and sends status messages to the CIM via a fiber optic module 40. Software also controls the LEDs 30 and alphanumeric display 44 on front panel 54 of the chassis and directly responds to the front panel pushbuttons and key-lock switches 56. In some configurations, the cooperative hardwired/software functions of the SLC Logic Processor include receiving signals from the Main Control Room Panel (MCRP) via a 24 Contact Input Module 42 and controlling indicator lights on the MCRP via solid state relays, and the pump and valves via a Latching Relay Control Module 42.

A Contact Input Module 42 (for example, a 24 Contact Input Module in some configurations) interfaces with the MCRP, where an operator can control SLC Logic Processor 100 using various switches and pushbuttons. Contact Input Module 42 also receives status signals from the pump, valves, and switch gear.

In some configurations of the present invention, fiber optic modules 40 include at least a transmitter. Fiber optic modules 40 provide a communication link between SLC Logic Processor 100 and the Reactor Trip and Isolation Function (RTIF) Communication Interface Module (CIM).

Figure 4:
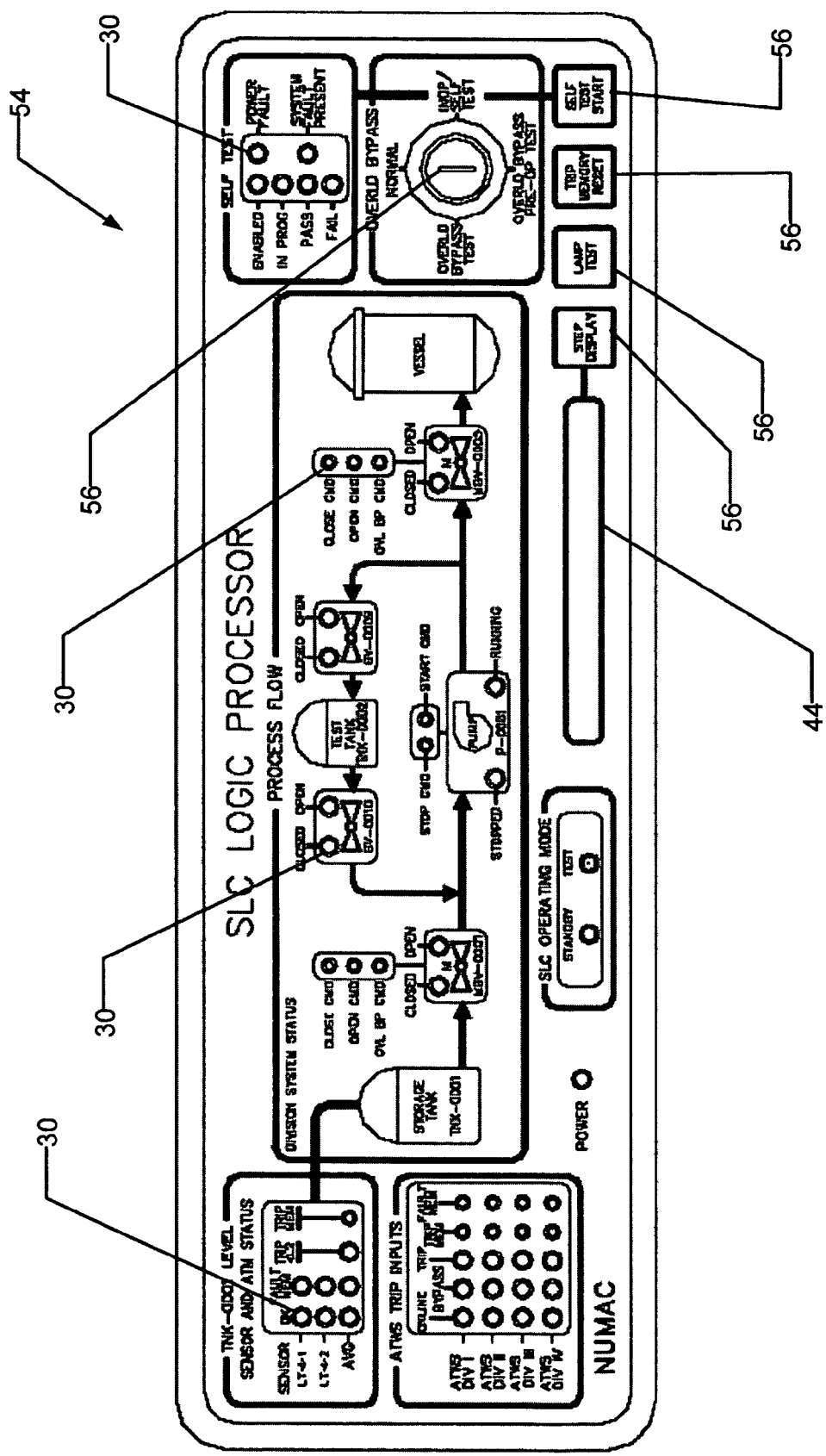
FIG. 4 is a pictorial diagram representative of a front panel of an instrument configuration represented by FIG. 3.

In some configurations and referring to FIG. 4, an SLC Front Panel 54 assembly provides a local interface between the operator and the SLC Logic Processor. The SLC Front Panel assembly includes pushbuttons and a keylock switch 56 that allows an operator to initiate a self-test and to monitor the status of the SLC Logic Processor and the boron injection system. LEDs 30 and display 44 on the front panel indicate the status of ATWS signals, Bypass signals, Analog Trip Module (ATM) signals, Main Control Room Panel (MCRP) signals, relays, self-test results, and the operating mode of the SLC Logic Processor.

In some configurations of the present invention, two Latching Relay Modules 42 each contain 12 mechanical latching relays and two solid-state relays. The latching relay contacts are used to control the pump starting and stopping functions as well as the valve opening and closing functions. Solid-state relays are used to drive the indicator lights located on the MCRP.

SLC Logic Processor logic card 10 provides the logic processing, monitoring and communication functions for the SLC Logic Processor. This module includes microcontroller 12, memory 38, 26, and 28, CPLDs 46, and interface logic. It receives signals from input modules 34 indicating the status of the MCRP signals and it receives the boron tank level signals. It controls the relays on Non-Latching Relay Modules 42 and interfaces with fiber optic modules 40 to transmit messages to the RTIF CIM. A microcontroller supervisor is provided in the form of a power supply monitoring circuit 14 that generates a reset signal if the input voltage from power supplies 16 and/or 18 are out of range. Monitoring circuit 14 in some configurations also resets CPLD 46 logic to its initialized state. A watchdog timer 58 times out if the microcontroller fails to send out a strobe signal within a predetermined period of time, for example, 1.12 seconds. Watchdog timer 58 in some configurations is electrically connected to the non-maskable interrupt (NMI) of microcontroller 12 so that expiration of watchdog timer 58 generates an NMI to microcontroller 12, causing a warm reboot. The watchdog timer does not reset the CPLD 46 logic, however.

In some configurations CPLDs 46 comprise complex, 560 macro-cell, Programmable Logic Devices (PLD) that are configured to provide: a) address decoding for EPROM 26 and RAM 28 memory devices and all memory mapped I/O functions; b) wait-state generator control on microcontroller 12 for slower peripheral access (front panel LED displays 30 and the twenty-four contact input card require two wait states in some configurations for a read or write access); c) addressable ports and registers that enable microcontroller 12 to access the status of input signals, output control, PLD revision and relay status; d) five output ports that interface with relay driver components; e) one output port that interfaces with a front panel display card; f) a 12 MHz to 1 MHz clock generator; and g) all functional logic for the SLC Logic Processor to 1) monitor the ATM trip status and contact input switch status, 2) process the contact inputs, and 3) generate pump and valve control commands.

Power input lines on the SLC Logic Module are protected by auto-resetting thermal current limiting devices that heat up when the current limit is reached and open-circuit until the over-current condition is corrected.

A 32-kilobyte EPROM 26 provides non-volatile storage for software in some configurations. In some configurations, all software is stored as firmware in non-volatile memory, so that software changes are performed by EPROM replacement. An 8-kilobyte static RAM 28 provides high-speed read/write memory required by the microcontroller 12 in some configurations. A non-volatile 2K×8 ferroelectric RAM 38 provided in some configurations provides storage for application parameters that should not be lost when power is removed. This RAM is a serial device with low power consumption and very high write endurance characteristics. A four wire serial interface through Port 1 of the microcontroller provides access to any byte within the memory device. Examples of variables to store in NVRAM 38 include, but are not limited to: 1) cold boot counter; 2) warm boot counter; 3) watchdog counter; 4) power supply voltage readings and settings; 5) error codes; and 6) self-test status.

LEDS 60 are provided on logic card 10 itself to provide test and/or fault indications. Various test and monitoring points are also provided at which voltages and timing can be observed if necessary.

SLC Logic Processor 100 includes logic card 10 interfaces to numerous electrical signals through connectors located on the back of its chassis, including a fiber optic output. Electrical inputs include contact closures on the main control room panel and on various pumps, flow meters, and pressure transducers. There are also several electrical contact inputs located on the front panel of the chassis. These inputs include pushbuttons and key-lock switch or switches 56.

Event-Based Operating System (EBOS)

In some configurations, a Standby Liquid Control (SLC) system for a nuclear power plant utilizes an INTEL® 87C196KD microcontroller 12, available from Intel Corporation, Santa Clara, Calif. The Logic Process Card 10 also includes 8 kilobytes of Random Access Memory (RAM) 28, 32 kilobytes of external Electrically Programmable Read Only Memory (EPROM) 26, and 2 kilobytes of non-volatile memory NVRAM 38. The "KD" version of microcontroller 12 also includes 1024 bytes of internal RAM and 32 kilobytes of one-time-programmable Read Only Memory (ROM), which are not used in some configurations of the present invention. In some configurations of the present invention, a non-preemptive Event-Based Operating System (EBOS) is provided that is particularly well suited for this hardware architecture and for SLC systems in nuclear power plants. However, EBOS configurations of the present invention are not limited to SLC systems, nuclear power plant uses, nor are they required to use particular types of microcontroller, microprocessors, computers, or logic cards.

Microcontroller 12 is a 16-bit CHMOS device that handles high-speed calculations and fast Input/Output (VO) operations.

The 87C196KD microcontroller 12 provides two separate internal timers that can be configured in various ways. Some configurations of the present invention provide a large number of timers, e.g., eight or more simultaneous timers. To avoid having to provide more hardware (i.e., external timers), some configurations of the present invention provide an EBOS that utilizes a limited number of hardware timers (e.g., the two timers of microcontroller 12) to produce the appearance of a large number of timers. Thus, some configurations of the present invention provide an EBOS and appropriate application software that detects and tracks multiple timing events with a number of timers less than the number of events to be timed. A central timing function is provided and is referred to herein as a system clock that provides discrete "ticks." The use of a single timer in some configurations of the present invention to provide a central timing function adds a level of determinism as all timing functions are controlled, monitored and updated from a single point.

Some configurations of the present invention provide both a scheduler and a system clock to manage timing events. Use of a scheduler provides increased abstraction and encapsulation for event-based operating system (EBOS), thereby reducing the amount of code necessary for implementation as well as increasing the modularity and decreasing the cost of software maintenance. A context switcher is also provided in some configurations. In an executive loop, a context switcher can comprise a software module that includes one or more CASE statements or a series of IF, ELSE statements, for example. (CASE and IF, ELSE statements are found in the C and C++ programming languages. Equivalent statements in other languages will be immediately recognized by those skilled in the art of computer programming. The use of C or C++ specific terminology in this description and the appended claims is not to be interpreted as limiting the present invention and claims to configurations utilizing or involving the C or C++ programming languages.) Some context switchers preempt an executing function and provide the overhead necessary to correctly restore the preempted function. However, in some configurations of the present invention, such preemption is not provided and its associated complexity is avoided. Instead, the context switcher invokes a branching activity utilizing abstraction and encapsulation.

Semaphores are provided and used in some configurations to protect atomic operations. For example, a single semaphore structure is provided in some configurations to inform application software remaining on the EBOS that an event has occurred while hiding the exact nature of the event. In this manner, functions can be modularized and stability and robustness of an SLC can be maintained EBOS events occur as the result of an external hardware interrupt of the scheduler or upon polling of input registers. In some configurations, the scheduler is also controlled by a hardware timer that generates an interrupt. Although the 8XC196KD microcontroller used in some configurations of the present invention is configured to handle hardware event interrupts, many configurations of the present invention restrict or limit the use of interrupts. The 8XC196KD microcontroller provides 18 different interrupts, including interrupt for Peripheral Status Timers (PST), Pulse Width Modulators (PWM), and High Speed I/O (HSIO). However, some configurations of the present invention restrict the interrupts that are used. For example, interrupts may be restricted to timer interrupts (for use with a system clock and scheduler), external interrupts for capturing pushbutton events, a Transmit (TX) interrupt for transmitting data on the microcontroller TX port, and a Non-Maskable Interrupt (NMI), which is used by a watchdog timer.

Table I is a listing of interrupts and priorities provided by the 8XC196KD microcontroller, all of which can be used in some configurations of the present invention.

TABLE I

| Priority | Interrupt Name | Interrupt Application Status |
|---|---|---|
| 0 | Timer overflow interrupt | disabled |
| 1 | A/D conversion complete interrupt | disabled |
| 2 | HSI data available interrupt | disabled |
| 3 | HSO interrupt | disabled |
| 4 | HSI.0 pin interrupt | disabled |
| 5 | Timer interrupt | disabled |
| 6 | Serial port interrupt | disabled |
| 7 | External interrupt | enabled (for pushbuttons in diagnostic mode only) |
| 8 | Transmit interrupt | enabled |
| 9 | Receive interrupt | disabled for normal mode, enabled for INOP self test |
| 10 | HSI fifo 4 interrupt | disabled |
| 11 | Timer 2 capture interrupt | disabled |
| 12 | Timer 2 overflow interrupt | enabled (for system clock) |
| 13 | External interrupt 1 | disabled |
| 14 | HSI fifo full interrupt | disabled |
| 15 | NMI | enabled (cannot be disabled) |
| N/A | Software trap | enabled for error handling |
| N/A | Unimplemented OpCode | enabled for error handling |

The use of interrupts adds determinism and the hardware interrupt priority scheme of the microcontroller provides prioritization for EBOS events. Interrupts on the 8XC196KD are processed in order of priority, wherein a higher numbered interrupt corresponds to a higher priority for processing. For some configurations of SLC, the order of processing is the NMI, the Software Timer Overflow, TX Data, and finally the external hardware interrupt. The Software Trap And Unimplemented Op Code interrupts are not assigned a priority. Some configurations use the Timer 2 Overflow interrupt instead of the general timer interrupt to raise the priority of the system clock and its functions and to assure that the system clock is given priority over any pushbutton, data transmission, or polled input event. In these configurations, the NMI (which is used by the watchdog) is the only event that supercedes the Timer 2 Overflow interrupt.

In some configurations of the present invention, each possible event that can be handled by the EBOS is assigned a priority, so that once a scheduled event becomes active, the scheduler will process the event with the highest priority. The events localized for use with one configuration of an SLC application are listed in Table II along with their priorities. Events are assigned priorities according to safety function and response time. In this particular configuration, a double word (DWORD) semaphore is used, so 31 of the 32 bits of the DWORD are used to correspond to the difference events and priorities. Note that, unlike interrupts, a lower assigned priority number indicates that an event is executed first. Although these events pertain to a particular SLC application configuration, a similar prioritized list can be made for events in many other event-driven systems. Thus, it will be appreciated that configurations of the present invention are not limited to being used solely with SLC applications.

TABLE II

| Priority | Event Name | Event Description |
|---|---|---|
| 1. | FUNCTION_TIME_OUT | A function has taken too much time. |
| 2. | SM_INPUT_CHANGE | The state machine inputs have changed. |
| 3. | MODE_CHANGE | The Instrument Mode has changed. |
| 4. | SELF_TEST | The self Test Status has changed. |
| 5. | ATWS_PRESENT | Generate valid ATWS Mitigation event pulse for one-half second, then ignore all input until the next pulse. |
| 6. | FLASH_LAMPS | One half second has elapsed, and if lamps are to be flashed, the state of the lamps, if on, should become off, and if the state of the lamps is off, the state should become on. |
| 7. | INJ_COMPLETE | Hold the injection complete signal for two and a half seconds past the expiration of the physical signal. |
| 8. | TX_MESSAGE | Half a second has elapsed since the last message transmission. |
| 9. | MBV5_OVERLOAD_BYPASS | The MBV5 Overload Bypass signal has been requested for two and a half seconds without a bypass signal |
| 10. | MBV1_OVERLOAD_BYPASS | The MBV1 Overload Bypass signal has been requested for two and a half seconds without a bypass signal |
| 11. | PUMP_START_TRIP | The pump start signal has been present for two and a half seconds. |
| 12. | PUMP_ON_SIGNAL | The pump has been running for more than two and a half seconds after a stop pump signal has been received (Intended off actual on). |
| 13. | PUMP_RUN_W_ATWS | An ATWS Initiate Auto Start Signal and Pump Running Signal have been present for two and a half seconds |
| 14. | BREAKER_NOT_SET | The stored energy signal is present for two and a half seconds without the breaker not being set. |
| 15. | MBV5_2_5_SEC_EVENT | A two and one-half second delay to allow the valve to start to move (open or close); otherwise, if not, the signal is set and held. |
| 16. | MBV5_VLV_STROK_EVENT | A thirty-one and one-half second delay to allow the valve to finish opening or closing, otherwise, if not, the signal is set and held. |
| 17. | MBV1_2_5_SEC_EVENT | A two and one-half second delay to allow the valve to start to move (open or close), otherwise, if not, the signal is set and held. |
| 18. | MBV1_VLV_STROKE_EVENT | A one hundred one and one-half second delay to allow the valve to finish opening or closing, if not, the signal is set and held. |

TABLE II-continued

| Priority | Event Name | Event Description |
|---|---|---|
| 19. | LAMP_TEST_EVENT | Schedule the continuation of a lamp test event, so that the lamp test function cannot monopolize the CPU |
| 20. | HEX_DUMP | A 5 second delay for the operator to press the correct sequence of keys to place the instrument in HEX Dump mode |
| 21. | MEMORY_RESET_EVENT | Schedule a memory reset event (as though the pushbutton were pressed) |
| 22. | FIVE_SEC_EVENT | Any event requiring five seconds, such as the full display self test or to refresh the single line display, schedule and notify when it is complete and run other tests in the meantime |
| 23. | STEP_DISPLAY_EVENT | Schedule a step display event (as though the pushbutton were pressed) |
| 24. | WDT_TEST | 1.12 seconds has elapsed to test the Watchdog timer |
| 25. | START_SELF_TEST | Schedule a start self test event (as though the pushbutton were pressed) |
| 26. | UPDATE_NVRAM_EVENT | A one minute event to update information in the NVRAM |
| 27. | INVALID_EVENT | Always the last event in the enumeration |
| 28-31 | N/A | Not used for this example SLC application configuration |

The executive loop keeps track of a single semaphore to which these events are bitmapped. To handle an event a function must be executed. In the exemplary configuration described herein, the scheduler event handler handles one event at a time (as specified by a DWORD semaphore) in the order of LSB to MSB, so that the event at 0 has the highest priority. In some configurations of the present invention, latency is considered in determining which of a plurality of events to execute. More particular, priority is given to a scheduled event that can finish executing in less time than another scheduled event if the priorities of these two events are otherwise equal. Although the absolute timer latency for both events is the same, the total latency for an event is equal to the latency for that event plus that of all events executed ahead of it. An event scheduled after another event thus incurs two latency periods and has twice the percentage latency of an event scheduled to occur immediately. However, a lengthier event incurring two latency periods may have a lower latency as a percentage of execution time tan a shorter event incurring one latency period. Thus, some configurations of the present invention schedule shorten events before longer event of the same priority.

In addition, some configurations of the present invention provide the lowest priorities to functions that are not safety-related. For example, a lamp test event is allowed to run for a maximum of one tick, which at the worst case for a 50 ms tick, could result in the lamp test running for 100 ms if the lamp test button is pressed immediately after a clock tick. If an operator continues to hold the lamp test button past 1 tick, the lamp test is re-scheduled. In the event that high priority events continuously bombard the SLC, the lamp test (or other low-priority, non-safety related) function may not be allowed to execute for some time. However, some configurations of the present invention are configured to allow all functions to run within in less than 6 ms, so it is unlikely that such a scenario would occur.

A Global flag semaphore is used in some configurations to allow or deny the execution of some functions or events. To guarantee that every event has the opportunity to execute and that high priority events can not monopolize the CPU 12, for every tick that an event is ACTIVE, a "Time Active" ECB entry is incremented. If twenty-six events are simultaneously scheduled in some configurations, each is given an opportunity to execute within its own 1 tick interval. In these configurations, if an event ages 26 ticks without executing, a shadow semaphore mask gives priority to that event and allows it to execute next.

Some configurations of the present invention guarantee determinism using of specified semaphores, a system clock and a schedule updater. The scheduler, in conjunction with the use of semaphores, is used to monitor events that consume more time than anticipated. The scheduler, using semaphores, will cause a system fault, pre-emption and subsequent warm start of the system, all of which will bring the abnormal condition to the attention of the operator, a desirable and deterministic result.

The different event handlers, pushbutton, timing and state machines, collectively, cause a running state machine to switch context from one processing state to another. Until there is a context switch, the state machine loops endlessly in a self testing mode run by the executive loop. Three event handlers are used to handle the different types of events that the machine encounters while in operation.

Figure 5:
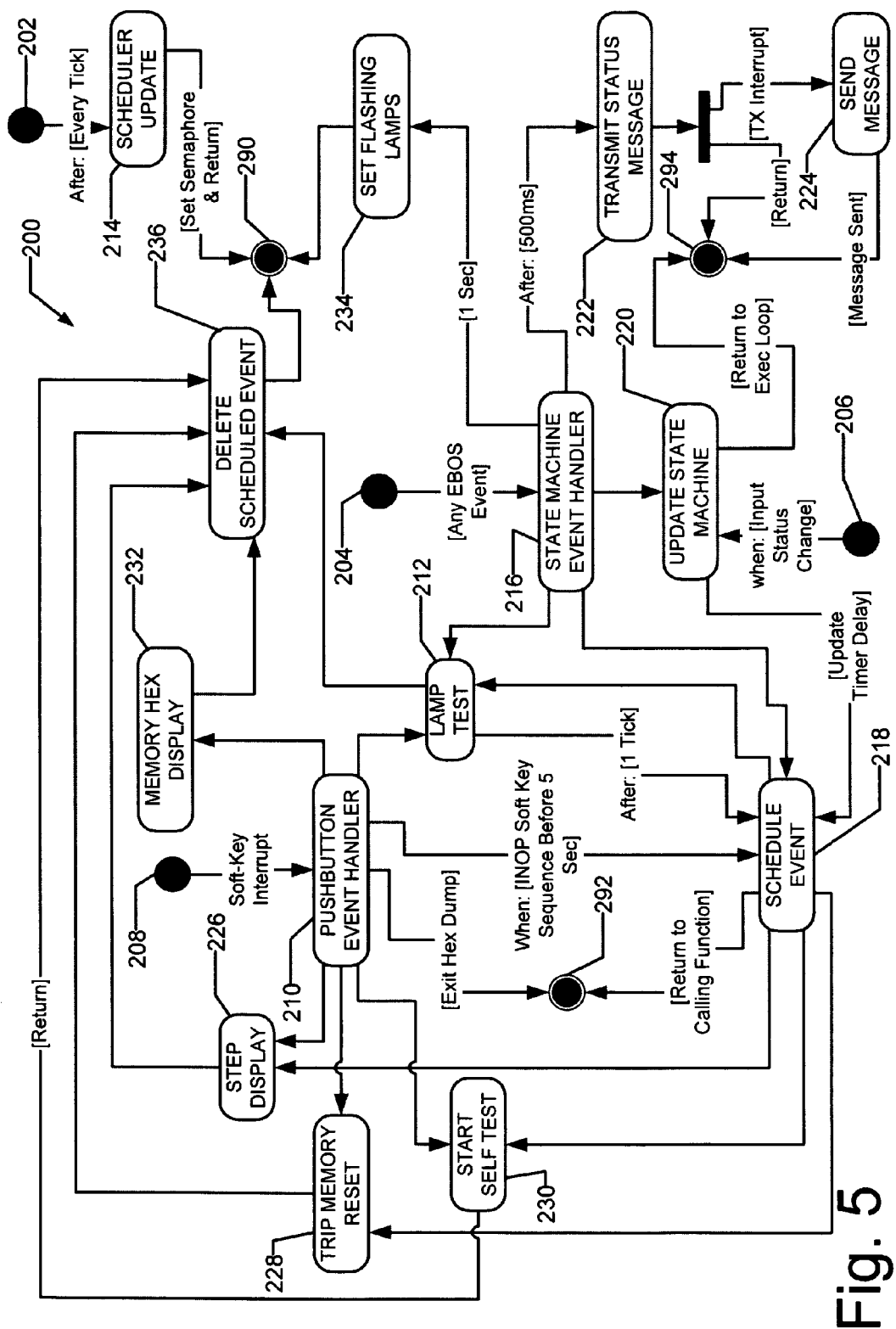
FIG. 5 is a flow diagram representative of an executive loop configuration of some configurations of the present invention.

More particularly, and referring to FIG. 5, some configurations of the present invention provide an executive loop represented at 222 by flow diagram 200. A technical effect of this loop is the timing and scheduling of events that occur during the operation of, for example, an industrial plant. Points 200, 204, 206, and 208 represent entry points that are labeled with the event that causes an event handler to be entered. Exit points are signified at 290, 292, and at 294. Push button events are handled almost exclusively by pushbutton event handler 210, which in some configurations can be entered only by an external interrupt caused by pressing a pushbutton. Lamp test function 212 is not allowed to monopolize the CPU, so after 50 ms or one clock "tick," lamp test function 212 is suspended to allow other events to be processed. Thus, before exiting, lamp test function 212 schedules itself to be run again, and timer/scheduler event handler 218 then handles this schedule. A system clock checks for scheduling events using a schedule update handler 214 in 50 ms intervals. When the user changes the mode or an input status change is detected, a state machine event handler 216 is entered. In a diagnostic mode, pushbutton events are handled immediately, and upon completion, context is returned to the function that was interrupted by the switch. Timer and state machine events generally result in a change to the state machine, wherein a state machine update handler 220 is called and context is returned to the executive loop at 294 upon completion. Status transmit events to the CIM are scheduled at 222. When the TX event occurs, the transmit buffer is filled and a separate sending function is spawned at 224 to transmits the message. Context is returned immediately to the executive loop at 294, which is also a final state once the message has been completely sent. Other event handlers, such as a step display handler 226, a trip memory reset handler 228, a start self-test handler 230, a memory hex display handler 232, and a set flashing lamp handler 234 are provided in various configurations of the present invention. Some events are deleted from the schedule after they are handled by a delete scheduled event handler 236.

Any event can be scheduled, but usually only timing events are scheduled. Alarms, such as "Valve failed to move," are captured some time after an initial signal. The event is scheduled at a time at which the timer should start. If the state machine changes, e.g. the valve traveling signal is asserted, the event is deleted from the schedule when the change occurs. Otherwise, the event occurs and causes an update to the state machine and the subsequent alarm associated with it.

Figure 6:
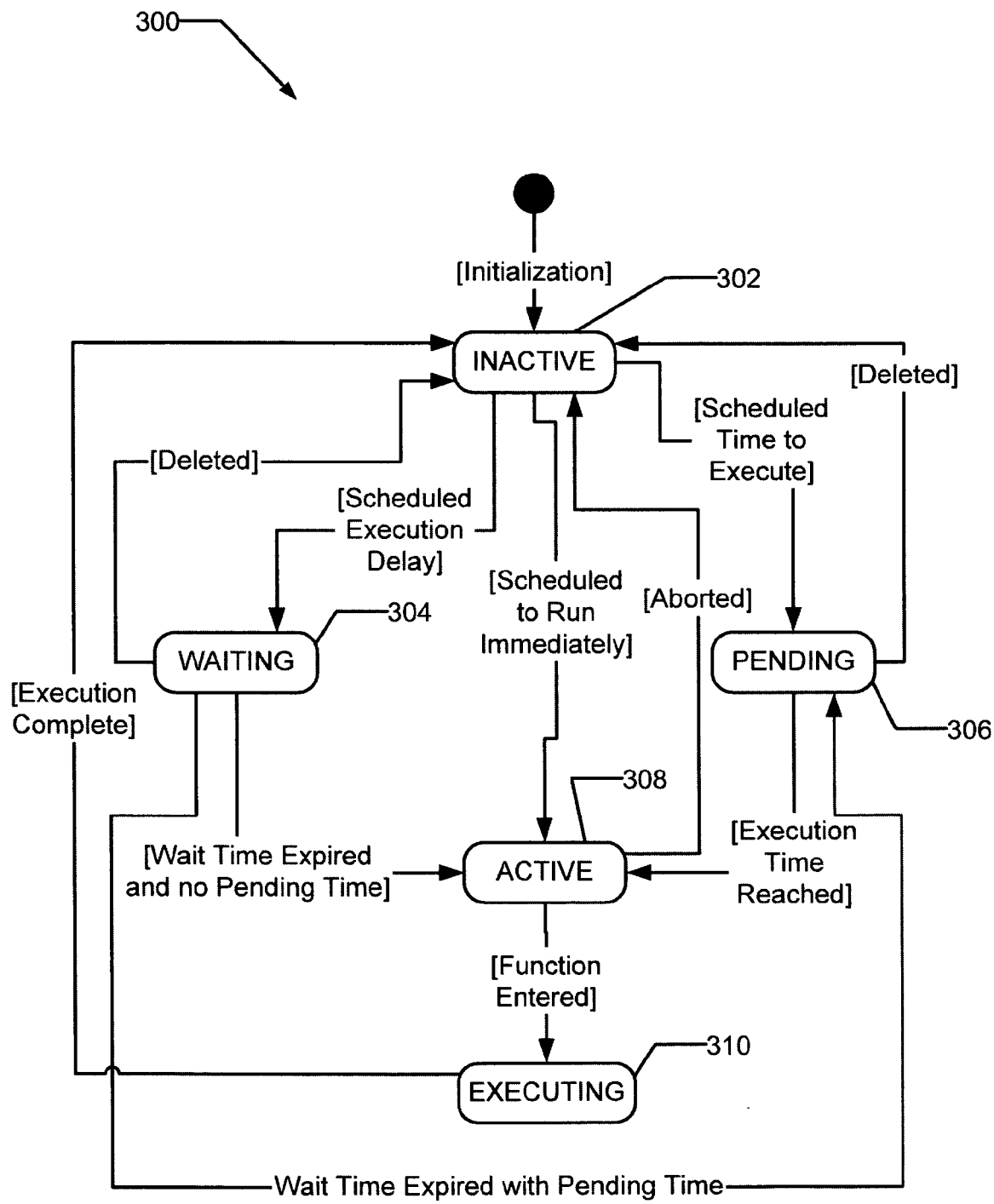
FIG. 6 is a state diagram representative of event states that can occur in some configurations of the present invention during executing of the executive loop of FIG. 5.

In some configurations and referring to state diagram 300 of FIG. 6, an event state is one of five different states, namely, Inactive 302, waiting 304, pending 306, active 308 or executing 310. When an event is scheduled, the execution time is set as a calculated number of clock ticks to achieve the desired timing requirements. With each tick, the execution time is decremented. When the execution time reaches zero, the state is changed as dictated by the scheduler state behavior described below. Wait times, time active, and time executed are also either incremented or decremented at each clock cycle by the schedule updater as described below.

The EBOS Scheduler uses a Scheduler Event Control Block (ECB) data structure. Each event has an entry in the ECB. As a non-limiting example, in some configurations, the ECB has the following structure:

```
typedef struct scheduler_ecb
{
EVENT_STATE event_state;
WORD wait_time;
WORD execution_time;
BYTE time_executed;
WORD time_active;
} ECB;
```

Each event scheduled can be in one of the following states, INACTIVE, ACTIVE, PENDING, EXECUTING or WAITING, corresponding to the states shown in state diagram 300. Each clock cycle or tick, the ECB is scanned and updated depending on the state of the particular event:

INACTIVE events are those that need no special attention from the scheduler.

ACTIVE events are events that are actively waiting for their turn to execute. Every tick an active event is not executed, the time_active Ecb entry is incremented.

PENDING events are events that are that have some time before they can execute, the schedule updater subtracts 1 from the 'time to execute' word in the ECB each clock Tick. When the 'time to execute' is zero that state is changed to ACTIVE.

EXECUTING event states are set at the entry of the function and are cleared at the exit of the function for some applications. In other applications, the executing state is used to signal program applications of specific implementation of a timer (e.g., a pulse or a delay timer). When used to control function entry and exit, there should only be one event executing at any one time, every cycle the event is executing, and the ECB 'execution time' is incremented. The execution time can be compared with time the event is allowed to execute, which is a hard code value. When used to signal a type of timed event, the state change can be used to signal a change in the application or executive loop state machine and logic paths.

WAITING events are those that have just executed and have an amount of time that they should wait before executing again. This value is set upon completion of execution of the event, and is counted down each Tick in a similar manner to the 'time to execute'. If an event is scheduled and the wait time exceeds the pending time, both are counted down, and if Pending is zero, then the state is changed directly to ACTIVE, other wise it is changed to PENDING and the remainder of the time is counted down. Values of 0XFFFFh are never decremented so that the event will wait forever unless the value is changed.

In some configurations of the present invention, the system clock executes one tick approximately every 50 ms. At each tick, the Event Control Block (ECB) is checked for scheduled events. If an event is present, the current function either is allowed to complete, or, if it is tagged as being "timed-out," is preempted. Usually, the function is allowed to complete execution and control is returned to the executive loop. The executive loop receives a scheduling semaphore and calls functions to update the state machine.

In some configurations of the present inventions, an external watchdog timer times out after 1.12 seconds, and is, under normal conditions, reset at 1.00 second or earlier. The watchdog is reset from the system clock ISR, which also performs the watchdog tasks. The system clock ISR is entered every 50 ms, and thus cannot be reset any sooner than after 50 ms. Normal mode self test functions are run by the executive loop and include various functions. Generally, each normal mode function executes within 50 ms, so that only one tick expires before the context switcher can change to a higher priority function. Some configurations of the present invention provide that most other function execute in less than 6 ms.

6.1 Data Store & Data Structures

Figure 7A:
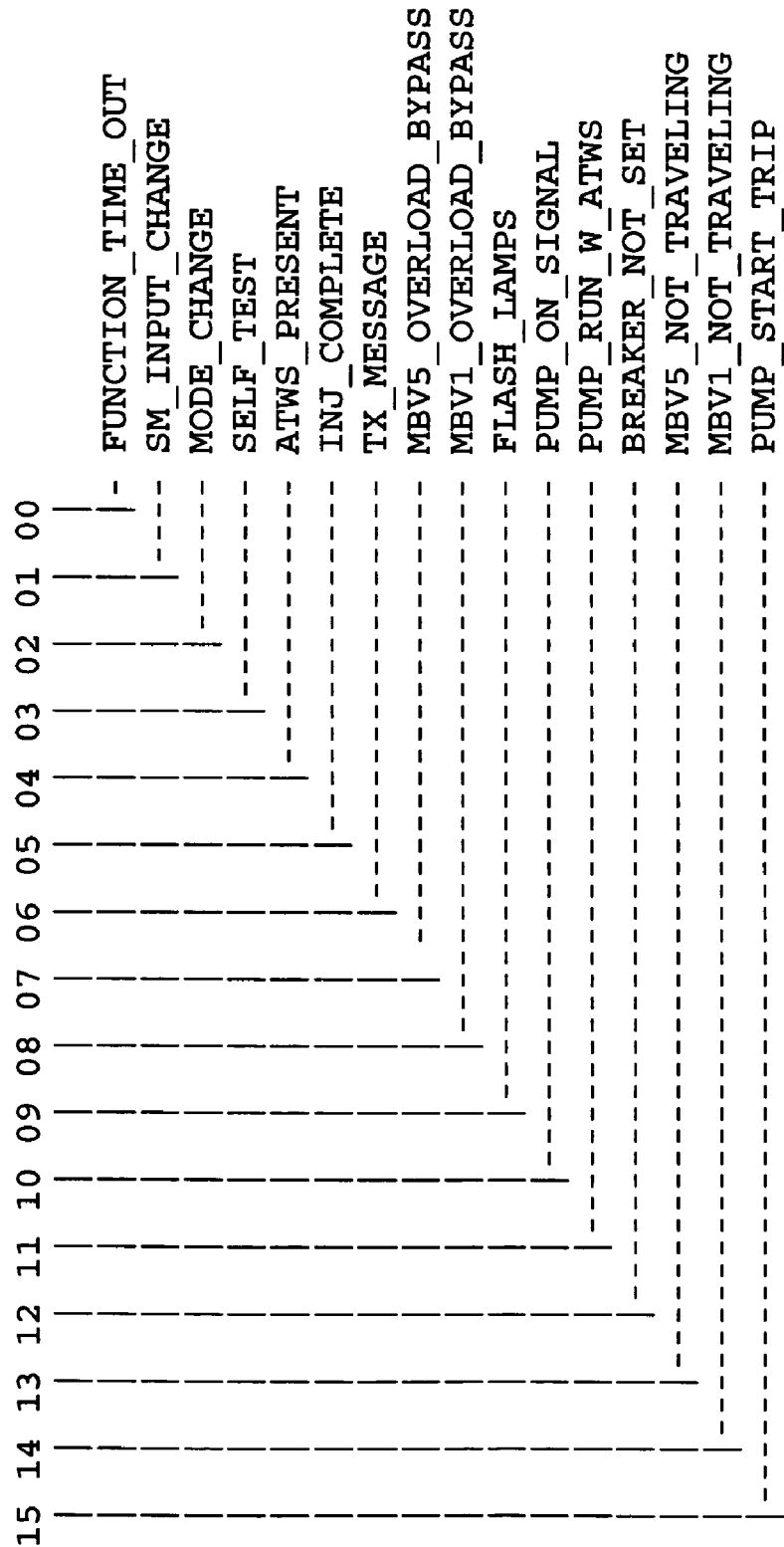
FIG. 7 is a representation of an event semaphore used in some configurations of the present invention.
Figure 8:
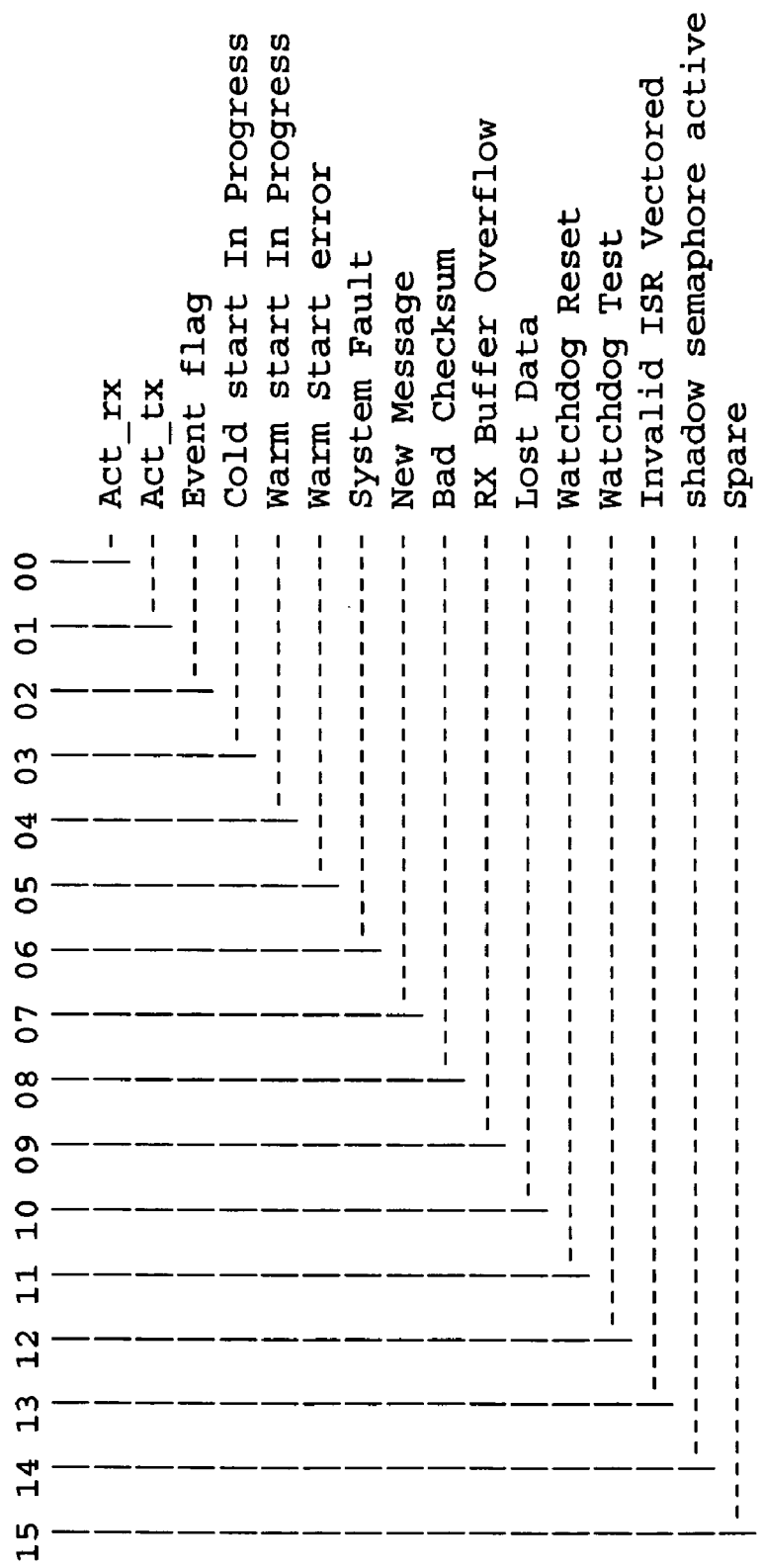
FIG. 8 is a representation of a flag semaphore used in some configurations of the present invention.

The EBOS uses semaphores to detect whether events are scheduled as well as to signal certain functions that must be known globally. The semaphores are divided into two groups, namely, scheduled events and system flags. Event semaphores are used to indicate that an event that has been scheduled is now active and awaiting execution. A system flag semaphore is used to control whether certain atomic functions are permitted to execute. These semaphores can be customized for use with particular applications. For some configurations of SLC applications, the specifications of these semaphores is provided in FIGS. 7 and 8.

The use of an event based micro OS, provides robust functionality and allows for multiple timing events to be tracked simultaneously, with only a small amount of overhead to the CPU.

It will be recognized that the term "controller" as used in the claims below is intended, unless further qualified, to be read as including within its scope, a microcontroller, a microprocessor, a CPU, a computer, or other similar device capable of running an operating system. The controller is intended to be capable of using that operating system to execute a program that uses sensors, timers, and/or switches to detect, time, and/or control events. The controller can be, but need not necessarily be, a microcontroller, and electronics used for memory and external signal interfaces can be, but need not necessarily be, integrated with the controller.

It will also be understood that a "processor," as used in the claims below and unless further qualified, can include a microcontroller, a microprocessor, or a CPU. Also, the EBOS can be provided in a non-volatile or volatile memory, such as those supplied with the SLC modules described above, or in the processor, microcontroller, CPU, etc. In some configurations, the EBOS can be provided on magnetic, optical, or other types of media, in configurations in which magnetic, optical, or other media readers are provided. For example, the EBOS can be provided as instructions in a non-volatile or volatile memory, or as a CD-ROM, DVD, CD-RW, DVD-RW, DVD+RW, floppy diskette, hard disk, or even a paper tape. Moreover, combinations of memory and/or media may be used, as instructions for a processor can be divided, arbitrarily or purposefully, across a plurality of different memory units and/or media. Therefore, unless otherwise qualified, "a machine readable medium or memory having recorded thereon or therein a non-preemptive operating system including instructions configured to instruct a processor to" do something should be construed as also encompassing a plurality of machine readable media and/or memories (not necessarily all of the same type) having these instructions recorded thereon or therein.

While the invention has been described in terms of various specific embodiments, those skilled in the art will recognize that the invention can be practiced with modification within the spirit and scope of the claims.

What is claimed is:

1. A method for operating a controller therein a non-preemptive operating system having a number of timers to thereby control a plurality of events greater than the number of said timers, said method comprising:

between clock ticks, receiving one or more signals indicating that an event from the plurality of event is inactive, waiting or executing from sensors, switches, executing programs or a combination thereof, wherein the one or more signals that initiate one or more timed events, the timed events including inactive events, active events, pending events, executing events, and waiting events;

on or after a clock tick immediately following said receiving of one or more signals, updating entries in an event control block in accordance with said received signal or signals, wherein said entries including a time remaining for pending events, a time past due for active events, a priority of each timed event, and indications of whether events of the plurality of events are inactive, waiting, pending, active, or executing, wherein said updating further includes updating a shadow semaphore within said operating system on a clock tick, and using said shadow semaphore to reprioritize past due events;

determining whether any pending event or events have timed out and activating any timed-out events;

sending a signal notifying an executing program of an activated event having a highest priority; and increasing priorities of past due active events that have not yet been signaled to the executing program.

2. A method in accordance with claim 1 wherein said sending a signal comprises sending a semaphore.

3. A method in accordance with claim 1 wherein said sending a signal further comprises sending a signal indicative of a timing type.

4. A method in accordance with claim 3 wherein said timing type is selected from the group consisting of delay timing indicative of a length of time a signal is received, pulse timing indicative of a specific time irrespective of a length of time a signal is received, and a maintained timing indicative of a signal maintained a predetermined time after said received signal is no longer active.

5. A non-transitory machine readable medium having recorded thereon instructions or therein a non-preemptive operating system, the instructions executable by a processor having a number of timers to thereby control a plurality of events greater than the number of said timers, to:

between clock ticks, receive one or more signals indicating that an event is inactive, waiting or executing from sensors, switches, executing programs or a combination thereof that initiate one or more timed events, the timed events including inactive events, active events, pending events, executing events, and waiting events;

on or after a clock tick immediately following said receiving of one or more signals, update entries in an event control block in accordance with said received signal or signals, said entries including a time remaining for pending events, a time past due for active events, a priority of each timed event and indications of whether said events of the plurality of events are inactive, waiting, pending, active, or executing, wherein said updating further include updating a shadow semaphore within said operating system on a clock tick, and using said shadow semaphore to reprioritize past due events;

determine whether any pending event or events have timed out and activating any timed-out events;

send a signal notifying an executing program of an activated event having a highest priority; and increase priorities of past due active events that have not yet been signaled to the executing program.

6. A medium in accordance with claim 5 wherein to send a signal, said instructions are configured to instruct the processor to send a semaphore.

7. A medium in accordance with claim 5 wherein to send a signal, said instructions are further configured to send a signal indicative of a timing type.

8. A medium in accordance with claim 7 wherein said timing type is selected from the group consisting of delay timing indicative of a length of time a signal is received, pulse timing indicative of a specific time irrespective of a length of time a signal is received, and a maintained timing indicative of a signal maintained a predetermined time after said received signal is no longer active.

9. A controller comprising a processor having a number of timers to thereby control a plurality of events greater than the number of said timers and memory including instructions executable by said processor, on said controller to:

between clock ticks, receive one or more signals indicating that an event is inactive, waiting or executing from sensors, switches, executing programs or a combination thereof that initiate one or more timed events, the timed events including inactive events, active events, pending events, executing events, and waiting events; on or after a clock tick immediately following said receiving of one or more signals, to update entries in an event control block in accordance with said received signal or signals, said entries including a time remaining for pending events, a time past due for active events, a priority of each timed event, and indications of whether said events of the plurality of events are inactive, waiting, pending, active, or executing, wherein said updating further include updating a shadow semaphore within said operating system on a clock tick, and using said shadow semaphore to reprioritize past due events;

determine whether any pending said event or events have timed out and activating any timed-out events;

send a signal notifying an executing program of an activated event having a highest priority; and increase priorities of past due active events that have not yet been signaled to the executing program.

10. A controller in accordance with claim 9 wherein to send a signal, said controller is configured to send a semaphore.

11. A controller in accordance with claim 9 wherein to send a signal, said controller is further configured to send a signal indicative of a timing type.

12. A controller in accordance with claim 11 wherein said timing type is selected from the group consisting of delay timing indicative of a length of time a signal is received, pulse timing indicative of a specific time irrespective of a length of time a signal is received, and a maintained timing indicative of a signal maintained a predetermined time after said received signal is no longer active.

* * * * *